United States Patent [19]

Maguire et al.

[11] Patent Number: 5,748,911
[45] Date of Patent: May 5, 1998

[54] SERIAL BUS SYSTEM FOR SHADOWING REGISTERS

[75] Inventors: David J. Maguire, Spring; Hung Q. Le, Katy, both of Tex.

[73] Assignee: Compaq Computer Corporation, Houston, Tex.

[21] Appl. No.: 684,710

[22] Filed: Jul. 19, 1996

[51] Int. Cl.⁶ .................................................. G06F 13/00
[52] U.S. Cl. ........................................... 395/281; 395/310
[58] Field of Search ................................. 395/281, 310, 395/426

[56] References Cited

U.S. PATENT DOCUMENTS

| | | | |
|---|---|---|---|
| 5,596,724 | 1/1997 | Mullins et al. | 395/250 |
| 5,608,876 | 3/1997 | Cohen et al. | 395/281 |
| 5,630,147 | 5/1997 | Datta et al. | 395/750 |
| 5,642,489 | 6/1997 | Bland et al. | 395/300 |
| 5,649,127 | 7/1997 | Hang | 395/307 |
| 5,666,495 | 9/1997 | Yeh | 395/281 |

OTHER PUBLICATIONS

I²C–bus and how to use it, Phillips Semiconductors, 1992.
Serialized IRQ Support for PCI Systems, Sep. 1, 1995, Rev. 6.0.
Intel® System Management Bus Specification, Rev. 1.0, Feb. 15, pp. 1–17, 1995.
Universal Serial Bus Specification, Rev. 0.9, pp. 14–22, pp. 63–80, Apr. 1995.

*Primary Examiner*—Jack B. Harvey
*Assistant Examiner*—David A. Wiley
*Attorney, Agent, or Firm*—Pravel, Hewitt, Kimball & Krieger

[57] ABSTRACT

A low latency serial bus system for shadowing registers between first and second digital devices. Either the first device or the second device may initiate a data transfer cycle on the serial bus when data in a shadowed register of that device has changed. The data transfer cycle includes a first frame where data is transferred from the first device to the second device and a second frame where data is transferred from the second device to the first device. The devices do not initiate a subsequent data transfer cycle for changed data if the changed data can be transferred in the current data transfer cycle.

30 Claims, 9 Drawing Sheets

SERIAL BUS SYSTEM FOR SHADOWING REGISTERS

BACKGROUND OF THE INVENTION

1. Field of the Invention

The present invention relates to updating information shared between one or more devices in a computer system, and more particularly, to a serial bus system for shadowing registers of these devices.

2. Description of the Related Art

Personal computers are constantly evolving to provide the user with the highest performance available at the lowest cost. Performance improvements in the microprocessor and memory systems have resulted in computers so powerful that they are now capable of performing tasks that before could only be performed by large mainframe computers. Technological change is especially exemplified in the area of portable computers where power consumption efficiency is balanced against features, cost, size, weight and performance. This is especially challenging since many computer users desire the portable computer to provide nothing less than what a desktop unit can provide. The term "portable computers" is used broadly here to denote the class of computers powered by battery or solar power. Those familiar with portable computers will recognize labels such as: portable, luggable, laptop, notebook and handheld which are used to designate certain marketing segments of the larger portable computer market.

Many options are available to the computer system designer. While simply designing around the highest performance processor available will go a long way towards providing a high performance product, in today's competitive market it is not enough. The processor must be supported by high performing components including a high performance expansion bus. Several standardized expansion buses are available to the system designer including an ISA (Industry Standard Architecture) bus and an EISA (Extended Industry Standard Architecture) bus.

For the system bus, a high performance bus, such as a Peripheral Component Interconnect (PCI) bus or the EISA bus is used. The three above-described buses are familiar to those skilled in the art.

Design choices also involve certain special features of the computer that distinguish one manufacturer's computer from a competitor's. In the portable computer market this is especially challenging since added features can cause increased size and weight. For example, since software can require large amounts of storage, a high capacity hard disk drive is often desirable. However, high capacity disk drives are usually much larger and heavier than desirable for a portable computer. It is also desirable to have the ability to add functionality to the portable computer. However, providing expansion bays compromises the small size.

One known method of providing certain features without sacrificing size and weight is through the use of an expansion base unit. An expansion base unit is a non-portable unit that typically operates from AC power and resides on a user's desktop. When the user is working at the desk, the portable computer plugs into or is "hot docked" into the expansion base unit to provide the added functionality. The expansion base unit may have a network interface unit for connecting to a local area network, a high capacity disk drive, a floppy drive and other peripherals. An additional hard drive may also be resident in the expansion base unit.

Typically, in a computer system having a laptop computer unit and an expansion base unit, bus devices need to share information relating to hot docking and power management. For example, both system and expansion bus devices of the laptop unit must know when the laptop unit is hot docking or undocking from the expansion base unit in order that the bus devices can be placed in idle states while the docking or undocking is occurring.

Thus, various registers must be present in the these bus devices that share common data. A problem occurs when the data in one of these registers is updated without updating the contents of the other registers.

Reflecting the contents of one register in another register is known as "shadowing." One register is a shadowed register, whose data is shadowed by one or more shadowing registers. One way to shadow a register is to perform bus write operations to every shadowing register when the shadowed register is updated with new data. However, the shadowed or the shadowing registers might be internal registers that are not updated or accessible through the expansion or system bus.

Furthermore, shadowing by write operations on the expansion or system bus reduces the effective bandwidth of the bus and interjects potential delays in the shadowing of the new data.

SUMMARY OF THE INVENTION

Briefly, the present invention relates to shadowing the contents of a first register in a second register. A serial bus is provided for transferring data between the first and second registers. A change detection circuit coupled to the first register monitors the data of the first register to determine if any bit of the first register has changed.

If the data of the first register has changed, then logic coupled to the first and second registers serially transmits the contents of the first register over the serial bus where it is received and loaded into the second register. Thus, the second register shadows the contents of the first register.

In the preferred embodiment of the present invention, a first digital device includes a first transmit register and a first receive register. A second digital device includes a second transmit register and a second receive register. The first and second digital devices are both coupled to a serial bus. The second receive register shadows the contents of the first transmit register, and the first receive register shadows the contents of the second transmit register.

If a change detection circuit coupled to the first transmit register detects a change in the data of the first transmit register, then logic coupled to the change detection circuit and the serial bus initiates a start frame of a data transfer cycle on the serial bus.

After the start frame, logic coupled to the second transmit register serially transmits the data of the second transmit register to the serial bus. Logic coupled to the first receive register and the serial bus then serially receives the data transmitted by the second transmit register and loads this data into the first receive register.

Upon completion of the transmission of the data of the second transmit register, logic coupled to the first transmit register and the serial bus serially transmits the data of the first transmit register to the serial bus. Logic coupled to the serial bus and to the second receive register serially receives the data transmitted by the first transmit register and loads this data into the second receive register.

If the change detection circuit of the first digital device detects a change in the data of the first transmit register after the initiation of the start frame but before the transmission of data from the first transmit register, then no subsequent data transfer cycle is initiated on the serial bus due to this change. No subsequent data transfer cycle is initiated because the data in the first transmit register is passed to the second receive register during the current data transfer cycle. Thus, an efficient system is presented for shadowing register data that only requires the use of one pin on the first and second devices.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

The following disclosures are hereby incorporated by reference:

U.S. application Ser. No. 08/684,486, entitled "BUS SYSTEM FOR SHADOWING REGISTERS," by Dwight D. Riley and David J. Maguire, filed concurrently herewith;

U.S. application Ser. No. 08/684,412, entitled "CIRCUIT FOR HANDLING DISTRIBUTED ARBITRATION IN A COMPUTER SYSTEM HAVING MULTIPLE ARBITERS," by David J. Maguire, Dwight D. Riley and James R. Edwards, filed concurrently herewith;

U.S. application Ser. No. 08/684,485, entitled "LONG LATENCY INTERRUPT HANDLING AND INPUT/OUTPUT WHILE POSTING," by David J. Maguire and James R. Edwards, filed concurrently herewith;

U.S. application Ser. No. 08/684,584, entitled "APPARATUS AND METHOD FOR POSITIVELY AND SUBTRACTIVELY DECODING ADDRESSES ON A BUS," by Gregory N. Santos, James R. Edwards, Dwight D. Riley and David J. Maguire, filed concurrently herewith;

U.S. application Ser. No. 08/671,316, entitled "TWO ISA BUS CONCEPT," by Gregory N. Santos, James R. Edwards, Dwight D. Riley and David J. Maguire, filed concurrently herewith;

U.S. application Ser. No. 08/684,490, entitled "RECONFIGURABLE DUAL MASTER IDE INTERFACE," by Gregory N. Santos, David J. Maguire, William C. Hallowell and James R. Edwards, filed concurrently herewith; and U.S. application Ser. No. 08/684,255, entitled "COMPUTER SYSTEM INCORPORATING HOT DOCKING AND UNDOCKING CAPABILITIES WITHOUT REQUIRING A STANDBY OR SUSPEND MODE," by Richard S. Lin, David J. Maguire, James R. Edwards and David J. Delisle, filed concurrently herewith; all of which are assigned to the assignee of this invention.

1. Overview of the Computer System

Figure 1:
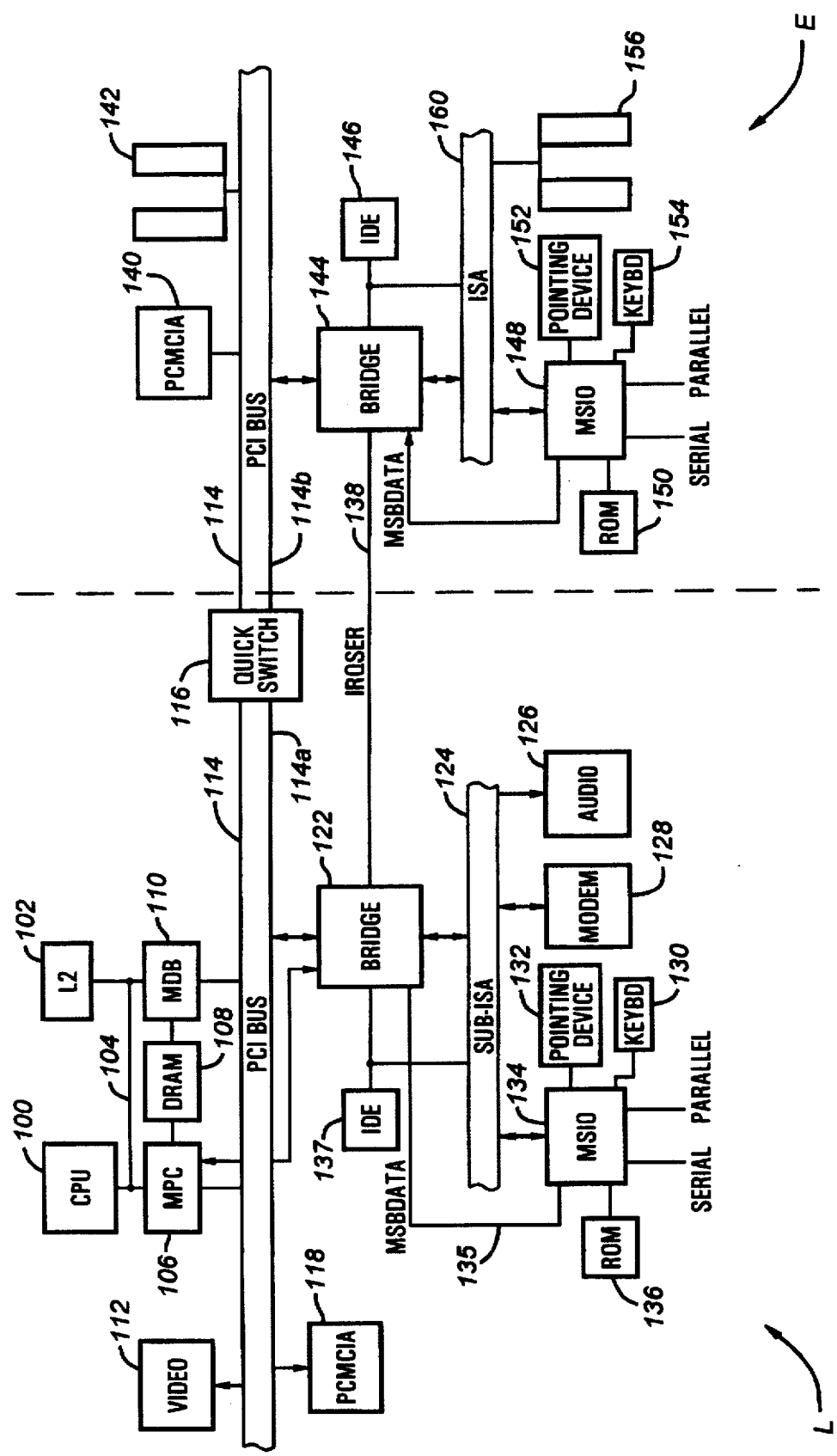
FIG. 1 is a block diagram illustrating a computer system incorporating the present invention.

Shown in FIG. 1 is a computer system having a laptop computer unit L and an expansion base unit E. The laptop computer unit L includes a central processing unit (CPU) 100 coupled to a local processor bus 104. Also coupled to the local processor bus 104 is a level two cache (L2) 102.

Interfacing the local processor bus 104 to a Peripheral Component Interconnect (PCI) bus 114 is a local processor bus-to-PCI bus interface bridge 106. The PCI bus 114 includes a segment 114a in the laptop unit L and a segment 114b in the expansion base unit E. The bridge 106 also functions as a system memory controller and has control and data lines coupled to a dynamic random access memory (DRAM) 108. The data lines of the memory 108 are coupled to data buffers 110. The data buffers are also coupled to the local processor bus 104 and the PCI bus 114.

The laptop computer unit L further includes a video board 112 and a Personal Computer Memory Card International Association (PCMCIA) card slot 118 which are coupled to the PCI bus 114. The laptop computer unit L includes several metal-oxide-semiconductor field-effect-transistor (MOSFET) switches represented by a quick switch circuit 116 for coupling the PCI bus 114 to external PCI bus connectors (not shown).

When the laptop computer unit L senses the expansion base unit E is being hot docked into the laptop computer unit L, the laptop computer unit L performs docking operations such as idling the PCI bus 114a. The laptop computer unit L then enables the quick switch circuit 116 which then couples the PCI bus 114a to the external PCI bus connectors. This couples the PCI bus segment 114a to the PCI bus segment 114b in order to create the PCI bus 114 shared by both the laptop computer unit L and the expansion base unit E.

When the laptop computer unit L senses the expansion base unit E is being undocked, the laptop computer unit L performs undocking operations such as idling the PCI bus 114a. The laptop unit L then disables the switch circuit 116. This isolates the PCI bus 114a from the external bus connectors.

The expansion base unit E further includes a PCMCIA slot 140 and two PCI card slots 142, both of which are coupled to the PCI bus 114. Both the laptop computer unit L and the expansion base unit E include bridge circuits, bridge circuit 122 and bridge circuit 144, respectively, of common design, which operate in two different modes. When the expansion base unit E is docked to the laptop computer unit L, the bridge circuit 122 operates in a laptop mode and the bridge circuit 144 operates in an expansion base mode, the relevant differences of which for this invention are described below.

The laptop computer unit L includes a sub-Industry Standard Architecture sub-(ISA) bus 124, a subset of the ISA bus, which is interfaced to the PCI bus 114 by the bridge circuit 122. Similarly, the bridge circuit 144 interfaces the PCI bus 114 to a complete ISA bus 160. Both the sub-ISA bus 124 and the ISA bus 160 are input/output (I/O) or expansion buses.

The sub-ISA bus 124 does not have interrupt request lines as a standard ISA bus. Instead the devices coupled to the sub-ISA bus 124 each furnish an interrupt request line to the bridge circuit 122 which can map the interrupt request signal associated with these lines to a standard set of ISA/EISA IRQ signals.

The bridge circuit 122, operating in the laptop mode, subtractively decodes PCI bus cycles from the PCI bus 114 when the laptop L is not docked to the expansion base unit E. When the laptop computer unit L is docked to the expansion base unit E, the bridge circuit 122 positively decodes the PCI bus cycles. The bridge circuit 144, operating in the expansion base mode, subtractively decodes the PCI bus signals.

In order to arbitrate for the commonly shared PCI system bus 114, the bridge circuit 122 includes an arbiter 214 (FIG. 2) which functions as a master, and the bridge circuit 144 has an arbiter (not shown) which functions as a slave. Both of these arbiters are idle when the laptop computer unit L is being hot docked or undocked to or from the expansion base unit E. The bridge circuit 122 and the bridge circuit 144 combine system interrupt information through a serial interrupt bus 138 coupled to the two bridge circuits 122 and 144, among others.

The laptop computer unit L further includes a modem 128 coupled to the sub-ISA bus 124, an audio system 126 coupled to the sub-ISA bus 124 and an Intelligent Device Electronics (IDE) interface 137 coupled both to the sub-ISA bus 124 and the bridge circuit 122. The bridge circuit 122 is further coupled to the bridge 106 for monitoring and controlling the idle status of the bridge 106.

Coupled to the sub-ISA bus 124 is a Mobile Super Input/Output (MSIO) device 134 which has an attached read only memory (ROM) 136, a pointing device 132 and a keyboard 130. The MSIO 134 also has a serial and a parallel port. Both the MSIO 134 and the bridge circuit 122 communicate information relating to power management and hot docking over a an MSBDATA serial bus 135. The serial bus 135 is used to shadow registers between the MSIO 134 and the bridge circuit 122, as further described below.

The bridge circuit 122 has a status register, TRANSMIT_REG register 303 (FIG. 4), which contains such information as the idle status of the CPU 100 and the idle status of the arbiter 214 of the bridge circuit 122. The MSIO 134 has a status register which shadows the TRANSMIT_REG register 303 register. When a bit in the TRANSMIT_REG register 303 of the bridge circuit 122 changes, the bridge circuit 122 serially transfers this new data to the MSIO 134 through the serial bus 135. The MSIO 134 receives this new data and loads the new data into its status register.

Similarly, the MSIO 134 has a request register, and the bridge circuit 122 has a register, RECEIVE_REG register 305 (FIG. 4), for shadowing this request register. When a bit in the request register of the MSIO 134 changes, then the MSIO 134 transfers this new data to the bridge circuit 122 through the serial bus 135. The bridge circuit 122 receives this new data and loads it into the RECEIVE_REG register 305.

The expansion base unit E further includes a MSIO 148 coupled to the ISA bus 160 of similar design to the MSIO 134. Two ISA slots 156 are coupled to the ISA bus 160, and an IDE interface 146 is coupled to both the bridge circuit 144 and the ISA bus 160.

The bridge circuit 144 and the MSIO 148 employ a serial bus system for shadowing registers of similar design to the system used by the bridge circuit 122 and the MSIO 134 in the laptop computer unit L. Because of this common design, only the shadowing of registers between the bridge circuit 122 and the MSIO 134 is discussed below.

2. Overview of the Bridge Circuit

Figure 2:
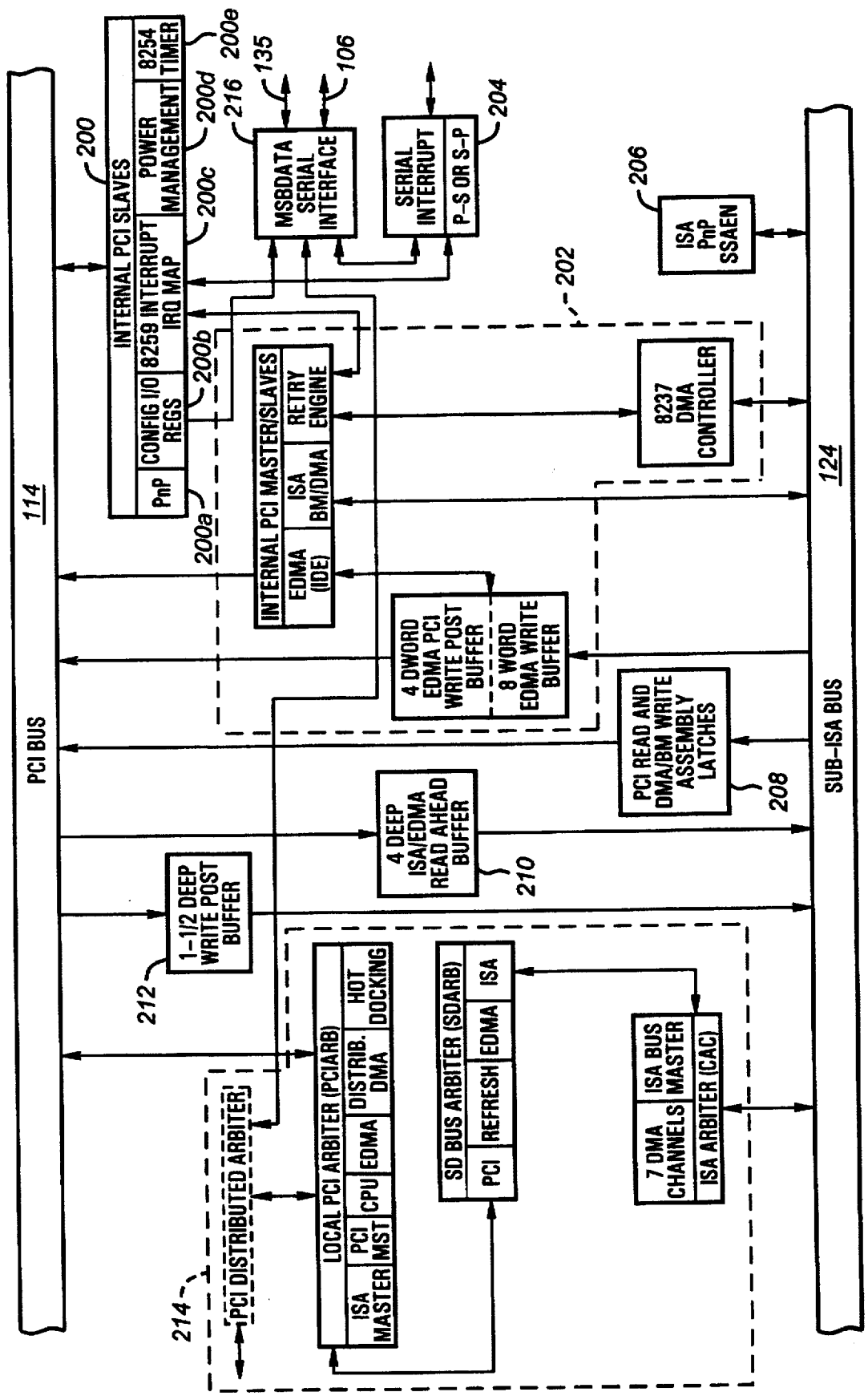
FIG. 2 is a block diagram illustrating the bridge circuits of FIG. 1.

Shown in FIG. 2 is a block diagram illustrating the circuitry of the bridge circuit 122. The bridge circuit 122 includes internal PCI slaves 200 which include plug-and-play registers 200a, configuration I/O registers 200b, a programmable interrupt controller 200c, power management circuitry 200d, and a system timer 200e. The bridge circuit 122 further includes an interrupt serial bus interface 204, plug-and-play registers 206, a direct memory access (DMA) circuit 202, read and write assembly latches 208, an ISA read ahead buffer 210, a write post buffer 212 and the arbiter 214.

Also shown in FIG. 2 is an MSBDATA serial interface 216. The MSBDATA serial interface 216 provides an interface to the serial bus 135 for shadowing registers between the bridge circuit 122 and the MSIO 134, as further described below. The MSIO 134 includes a serial interface of similar design to the serial interface 216. Thus, only a detailed description of the serial interface 216 is given below.

The serial interface 216 receives status signals from the arbiter 214, the bridge 106 and the interrupt serial bus interface 204. These status signals form the TRANSMIT_REG register 303. The serial interface 216 also provides request signals to the interrupt serial bus 204, the arbiter 214 and the bridge 106. These request signals form the RECEIVE_REG register 305.

3. Overview of the Serial Bus

Figure 7:
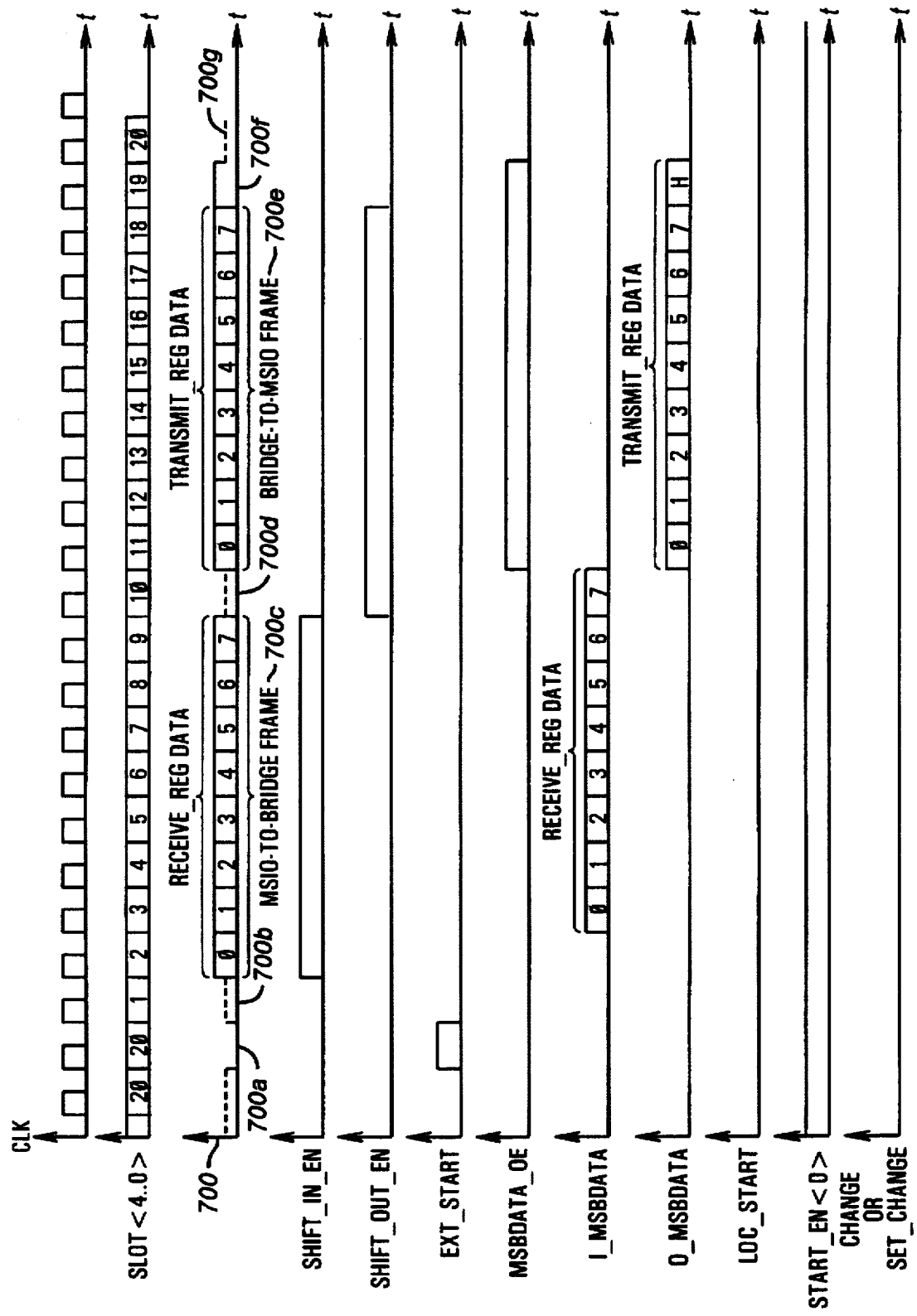
FIG. 7 is a timing diagram illustrating the various signals present in the serial interface when a data transfer cycle has been initiated by another device on the serial bus.
Figure 8:
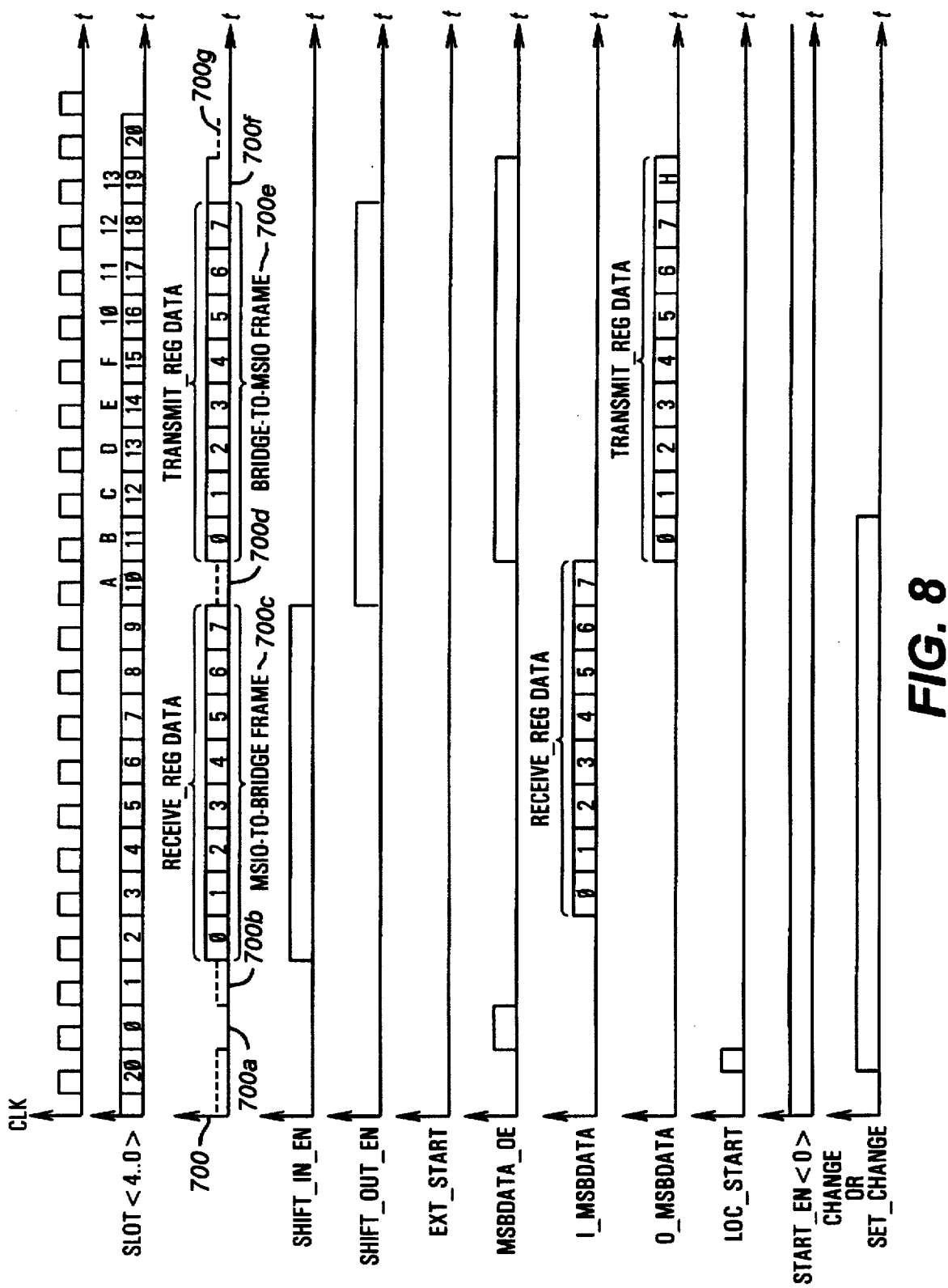
FIG. 8 is a timing diagram illustrating the various signals present in the serial interface when a data transfer cycle has been initiated on the serial bus by the serial interface.

Shown in FIGS. 7 and 8 are timing diagrams of the signals 700 present on the serial bus 135 which accompany a DATA_TRANSFER cycle. When tristated, the serial bus 135 is "high." The serial bus 135 is clocked and data transfers occur on the positive edge of a PCI clock signal, CLK, provided by the PCI bus 114.

Data is transferred on the serial bus 135 during the DATA_TRANSFER cycle. The DATA_TRANSFER cycle begins with a START frame 700a. This occurs when the serial bus 135 comes out of an idle state and is negated for one cycle of the CLK signal.

After the START frame 700a, a first TURN-AROUND frame 700b is present in the DATA_TRANSFER cycle. A TURN-AROUND frame occurs when the serial bus 135 is tristated for one cycle of the CLK signal. After the TURN-AROUND frame 700b, the data from the shadowed request register in the MSIO 134 is serially transferred to the serial bus 135 in a least significant bit first fashion. This data is serially received by the serial interface 216 and transferred into the RECEIVE_REG register 305. This transfer of data from the MSIO 134 to the bridge circuit 122 is referred to as a MSIO-TO-BRIDGE frame 700c of the DATA_TRANSFER cycle. This transfer takes eight cycles of the CLK signal.

Next, another TURN-AROUND frame 700d occurs where the serial bus 135 is tristated for one cycle of the CLK signal. During the next frame of the DATA_TRANSFER cycle, the data from the shadowed register of the bridge circuit 122, TRANSMIT_REG register 303 is transferred to the serial bus 135 in a least significant bit first fashion. This is referred to as a BRIDGE-TO-MSIO frame 700e of the DATA_TRANSFER cycle.

After the BRIDGE-TO-MSIO frame 700e, the serial bus 135 is asserted for a HIGH frame 700f of the DATA_TRANSFER cycle. The HIGH frame 700f lasts for one cycle of the CLK signal. The HIGH frame 700f completes the DATA_TRANSFER cycle. After this, another TURN-AROUND frame 700g is required before a subsequent DATA_TRANSFER cycle.

The START frame 700a can be driven by either the MSIO 134 or the bridge circuit 122, but the MSIO-to-bridge frame is always transmitted first, followed by the bridge-to-MSIO frame. The bridge 122 drives the serial bus 135 for the HIGH frame 700f.

The described embodiment relates to one register that is shadowed in each of the bridge 122 and the MSIO 134 circuits; however, the present invention is not necessarily limited to the shadowing of two registers. For example, the bridge circuit 122 could include an additional register that is shadowed by the MSIO 134. In this case, an additional BRIDGE-TO-MSIO frame would be added to the DATA_TRANSFER cycle to transfer this data.

Similarly, an alternative embodiment might include only one shadowed register in the bridge circuit 122 and no register in the bridge circuit 122 for shadowing a register in the MSIO 134. In this case, one DATA_TRANSFER cycle of the serial bus 135 would include a BRIDGE-TO-MSIO frame but no MSIO-TO-BRIDGE frame.

To summarize the format of a DATA_TRANSFER cycle on the serial bus 135, the START frame 700a, after the TURN-AROUND frame 700b, is followed by the MSIO-TO-BRIDGE frame 700c. During the MSIO-TO-BRIDGE frame 700c, data from the MSIO 134 is transferred to the bridge circuit 122. After the other TURN-AROUND frame 700d, shadowed data from the bridge circuit 122 is transferred to the MSIO 134 during the BRIDGE_TO_MSIO frame 700e. The HIGH frame 700f completes the DATA_TRANSFER cycle with the one TURN-AROUND frame 700g requirement between successive DATA_TRANSFER cycles.

4. The Serial Interface a. Overview

Figure 3:
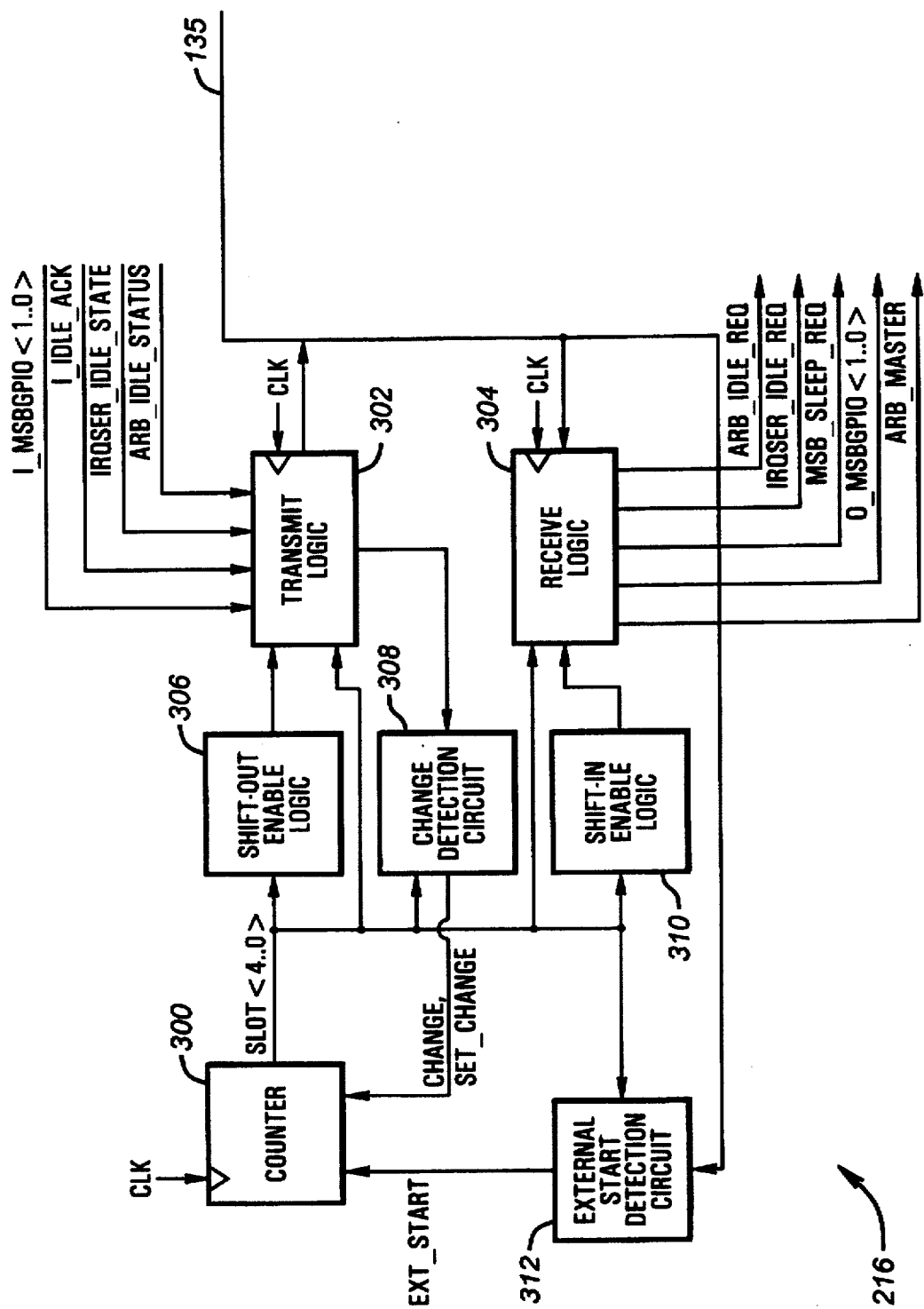
FIG. 3 is a block diagram illustrating the serial interface of FIG. 2.

The MSBDATA serial interface 216 includes a counter 300 (FIG. 3) which generates a 5 bit SLOT<4..0> signal to track the frames of the DATA_TRANSFER cycle. The SLOT<4..0> signal is provided to shift-out enable logic 306, shift-in enable logic 310, a change detection circuit 308, an external start detection circuit 312, transmit logic 302 and receive logic 304.

The shift-out enable logic 306 enables the transmit logic 302 to serially transmit the bits of the TRANSMIT_REG register 303 to the serial bus 135 in a least significant bit first fashion. The CLK signal is provided to the transmit logic 302, and when enabled, the transmit logic 302 transmits one bit of the TRANSMIT_REG register 303 to the serial bus 135 every cycle of the CLK signal. The enabling of the transmit logic 302 by the shift-out enable logic 306 occurs when the shift-out enable logic 306 recognizes the BRIDGE-TO-MSIO frame 700e from the received SLOT<4..0> signal.

The shift-in enable logic 310 enables the receive logic 304 to serially receive the bits of the RECEIVE_REG register 305 from the serial bus 135 in a least significant bit first fashion. The CLK signal is provided to the receive logic 304 and when enabled, the receive logic 304 receives one bit of the RECEIVE_REG register 305 from the serial bus 135 every cycle of the CLK signal. The enabling of the receive logic 304 by the shift-in enable logic 310 occurs when the shift-in enable logic 310 recognizes the MSIO-TO-BRIDGE frame 700c from the received SLOT<4..0> signal.

The change detection circuit 308 monitors the data of the TRANSMIT_REG register 303 to determine when a bit in the TRANSMIT_REG register 303 has changed. The change detection circuit 308 provides an indication of this to the counter 300 through a CHANGE signal and a SET_CHANGE signal.

The SET_CHANGE signal, when asserted, indicates the data of the TRANSMIT_REG register 303 has recently changed on the last positive edge of the CLK signal. The SET_CHANGE signal is otherwise negated. The CHANGE signal is asserted after this change until the data of the TRANSMIT_REG register 303 has been transferred to the serial bus 135. The CHANGE signal is otherwise negated.

When a bit changes in the TRANSMIT_REG register 303, the change detection circuit 308 initializes the counter 300, and the serial interface 216 asserts the START frame 700a on the serial bus 135 which begins the DATA_TRANSFER cycle. The counter 300 then begins counting time slots, as indicated by the SLOT<4..0> signal, for the DATA_TRANSFER cycle. Each time slot corresponds to a cycle of the CLK signal.

Another device on the serial bus 135, such as the MSIO 134, can also assert the START frame 700a. If this occurs, the external start detection circuit 312 coupled to the serial bus 135 provides an indication of this to the counter 300 through an EXT_START signal. When the EXT_START signal is asserted, this indicates another serial bus device has asserted the START frame 700a. Upon this occurrence, the counter 300 then begins counting time slots for the DATA_TRANSFER phase as indicated by the SLOT<4..0> signal. The EXT_START signal is otherwise negated.

If the CHANGE signal is asserted and the current DATA_TRANSFER cycle is initiated by another serial bus device, such as the MSIO 134, then the change detection circuit 308 determines whether the changed data of the TRANSMIT_REG register 303 can be serially transmitted to the serial bus 135 during the current DATA_TRANSFER cycle. If so, then the change detection circuit 308 does not initiate a subsequent DATA_TRANSFER cycle to transfer this data; therefore, the change detection circuit 308 negates the CHANGE signal. If, however, a change in the contents of the TRANSMIT_REG register 303 is detected after the beginning of the BRIDGE-TO-MSIO frame 700e, then the CHANGE signal remains asserted so that two back-to-back transfers will occur.

The SLOT<4..0> signal tracks the frames of the DATA_TRANSFER cycle. The SLOT<4..0> signal performs this function by counting time slots of the DATA_TRANSFER cycle. The SLOT<4..0> signal represents an integer number from "0" through "20." When the serial bus 135 is idle, the SLOT<4..0> signal is equal to "20."

For the SLOT<4..0> signal equal to "1" through "19," the DATA_TRANSFER cycle is occurring on the serial bus 135. When the SLOT<4..0> signal is equal to "1," the serial bus 135 is tristated during the first TURN-AROUND frame 700b of the DATA_TRANSFER cycle. For the SLOT<4..0> signal equal to "2" through "9," the DATA_TRANSFER cycle is in the MSIO-TO-BRIDGE frame 700c. During this frame, the data for the TRANSMIT_REG register 303 is provided by the serial bus 135, starting with the least significant bit first. When the SLOT<4..0> signal equals "10," the DATA_TRANSFER cycle is in the TURN-AROUND frame 700d. This allows drivers of the serial bus 135 to switch, if necessary.

For the SLOT<4..0> signal equal to "11" through "18," the DATA_TRANSFER cycle is in the BRIDGE-TO-MSIO frame 700e. During this frame, the data for the TRANSMIT_REG register 303 is provided to the serial bus 135 in a least significant bit first fashion. For the SLOT<4..0> signal equal to "19," the serial bus 135 is asserted as the DATA_TRANSFER cycle is in the HIGH frame 700f. When the SLOT<4..0> signal is equal to "20," the serial bus 135 is tristated as the serial bus 135 is idle.

In summary, the TRANSMIT_REG register 303 is shadowed by the status register of the MSIO 134, and the RECEIVE_REG register 305 shadows the request register of the MSIO 134. The shift-out enable logic 306 and the shift-in enable logic 310 enable the serial transmission and reception of the bits of the TRANSMIT_REG 303 and RECEIVE_REG 305 registers during the appropriate frames of the DATA_TRANSFER cycle. The change detection circuit 308 detects a change in the data of the shadowed TRANSMIT_REG register 303 and initializes the counter 300 appropriately when this occurs. The counter 300 tracks the frames of the DATA_TRANSFER cycle through its SLOT<4..0> signal which counts the time slots of the DATA_TRANSFER cycle. A DATA_TRANSFER cycle initiated by the MSIO 134 is detected by the external start detection circuit 312 which initializes the counter 300 appropriately.

b. The Registers

Figure 4:
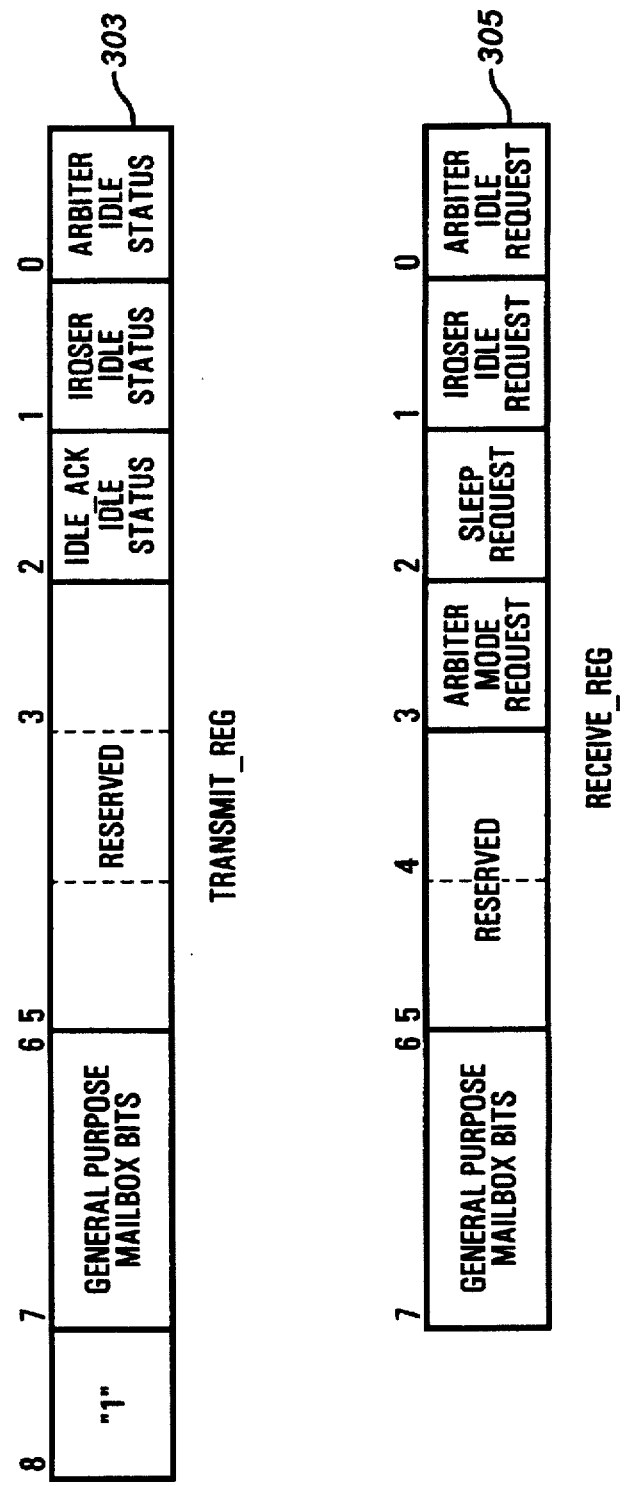
FIG. 4 is an illustration of the transmit and receive registers of the present invention.

FIG. 4 illustrates the contents of the RECEIVE_REG register 305 that shadows the request register of the MSIO 134. When a bit changes in the shadowed request register of the MSIO 134, the MSIO 134 asserts the START frame 700a and transfers the contents of the request register in the MSIO-TO-BRIDGE frame 700c of the DATA_TRANSFER cycle. The RECEIVE_REG register 305 serially receives this data.

Bit 0 of the RECEIVE_REG register 305 is an arbiter idle request bit. A value of "1" for this bit indicates a request for the arbiter 214 of the bridge circuit 122 to enter an idle mode, and a value of "0" for this bit indicates a request for the arbiter 214 to become active. This bit is represented by an ARB_IDLE_REQ signal which is provided by the receive logic 304 and received by the arbiter 214. During the idle mode of the arbiter 214, all bus activity ceases and the PCI bus 114 is parked at the bridge circuit 122. This normally occurs when hot docking or undocking is occurring between the laptop computer unit L and the expansion base unit E.

Bit 1 of the RECEIVE_REG register 305 is an interrupt serial bus idle request bit. A value of "1" for this bit indicates a request for the interrupt serial bus 138 to enter an idle state, and a value of "0" for this bit indicates a request for the interrupt serial bus 138 to be active. This bit is represented by a IRQSER_IDLE_REQ signal which is provided by the receive logic 304 and received by the interrupt serial bus interface 204.

Bit 2 of the RECEIVE_REG register 305 is a sleep request bit. When this bit has a value of "1," the bridge circuit 122 asserts a SLEEP_REQ signal at its output which instructs the bridge 106 to request the CPU 100 to enter a STOP cycle. When the SLEEP_REQ signal is asserted, the bridge 106 enters a SLEEP state and only can exit the sleep mode when accessed from the PCI bus 114 or when SLEEP_REQ is negated. When this bit has a value of "0," the SLEEP_REQ signal is negated.

Bit 3 of the RECEIVE_REG register 305 is an arbiter mode request bit. This bit is represented by an ARB_MASTER signal which is provided by the receive logic 304 and received by the arbiter 214. A value of "1" for this bit indicates a request for the arbiter 214 to enter the master mode. A value of "0" for this bit indicates a request for the arbiter 214 to enter the slave mode. As previously mentioned, in normal operation, the arbiter 214 of the bridge circuit 122 operates in the master mode, and the arbiter (not shown) of the bridge circuit 144 operates in the slave mode. These arbiters work together to function as one effective arbiter for the PCI bus 114.

Bits 4–5 of the SHIFT_IN_REG register 308 are reserved. Bits 7–6 of the RECEIVE_REG register 305 are general purpose mailbox bits. These bits are represented by a two bit O_MSBGPIO<1..0> signal. These bits are used to receive and transmit miscellaneous data from and to the MSIO 134. Each of these two bits has a corresponding bit in a MSBGPIO_CONFIG_REG register, one of the registers 200b, which determines whether each mailbox bit functions as an output or as an input.

If the pin is functioning as an input, the value for this bit is set by a system device wishing to pass information to the MSIO 134 through an input pin of the bridge circuit 122. The value of this bit is reflected in the RECEIVE_REG register 305. If one of the general purpose mailbox pins is functioning as output, then the bit reflects the value set by the MSIO 134 in the corresponding general purpose mailbox bit in its request register. The level of each of the mailbox bits is present at corresponding pins of the bridge circuit 122.

FIG. 4 also illustrates the data of the TRANSMIT_REG register 303 that is shadowed by the status register of the MSIO 134. Bit 0 of the TRANSMIT_REG register 303 is an arbiter idle status bit, the value of which is represented by an ARB_IDLE_STATUS signal. The ARB_IDLE_STATUS signal is received from the arbiter 214. When bit 0 has a value of "1," the ARB_IDLE_STATUS signal is asserted, and when bit 0 has a value of "0," the ARB_IDLE_STATUS signal is negated. If the ARB_IDLE_STATUS signal is asserted, then the arbiter 214 of the bridge circuit 122 is in an idle mode. If the ARB_IDLE_STATUS signal is negated, then the arbiter 214 is in the master or slave mode.

Bit 1 of the TRANSMIT_REG register 303 relates to the status of the interrupt serial bus 138. The value of bit 1 is represented by the IRQSER_IDLE_STATUS signal which is received from the interrupt serial bus interface 204. When bit 1 has a value of "1," the IRQSER_IDLE_STATUS signal is asserted, and when bit 1 has a value of "0," the IRQSER_IDLE_STATUS signal is negated. If the IRQSER_IDLE_STATUS signal is asserted, then the current frame on the interrupt serial bus 138 is complete, and the interrupt serial bus 138 is inactive. When the IRQSER_IDLE_STATUS signal is negated, the interrupt serial bus 138 is currently running a frame.

Bit 2 of the TRANSMIT_REG register 303 reflects the level of the IDLE_ACK pin of the bridge circuit 122. The level of the IDLE_ACK pin indicates the response of the CPU 100 to the assertion of the SLEEP_REQ signal. A low value indicates the CPU 100 has acknowledged the request. The value of this bit is reflected in an IDLE_ACK pin which is provided by the bridge 106. When the IDLE_ACK pin is asserted, the I_IDLE_ACK signal is asserted, and when the IDLE_ACK pin is negated, the I_IDLE_ACK signal is negated.

Bits 3–5 of the TRANSMIT_REG register 303 are reserved. Bits 6 and 7 correspond to the general purpose mailbox bits, as described above with the discussion of the RECEIVE_REG register 305. When one of these bits is configured in an output mode, then the bit reflects the value received from the status register of the MSIO 134. If, however, one of the bits is configured in the input mode, then the value of this bit is sent to the shadowing register of the MSIO 134. Bits 6 and 7 are represented by an I_MSBGPIO<0> signal and an I_MSBGPIO<1> signal, respectively. Bit 8 of the TRANSMIT_REG register 303 is always set equal to "1," as part of the serial interrupt protocol.

In summary, the TRANSMIT_REG register 303 contains status bits which are shadowed by the status register of the MSIO 134. Similarly, the RECEIVE_REG register 305 contains request bits that shadow the request register of the MSIO 134. Both the MSIO 134 and the bridge circuit 122 use two general purpose mailbox bits to transfer miscellaneous information.

c. The Change Detection Circuit

Figure 5:
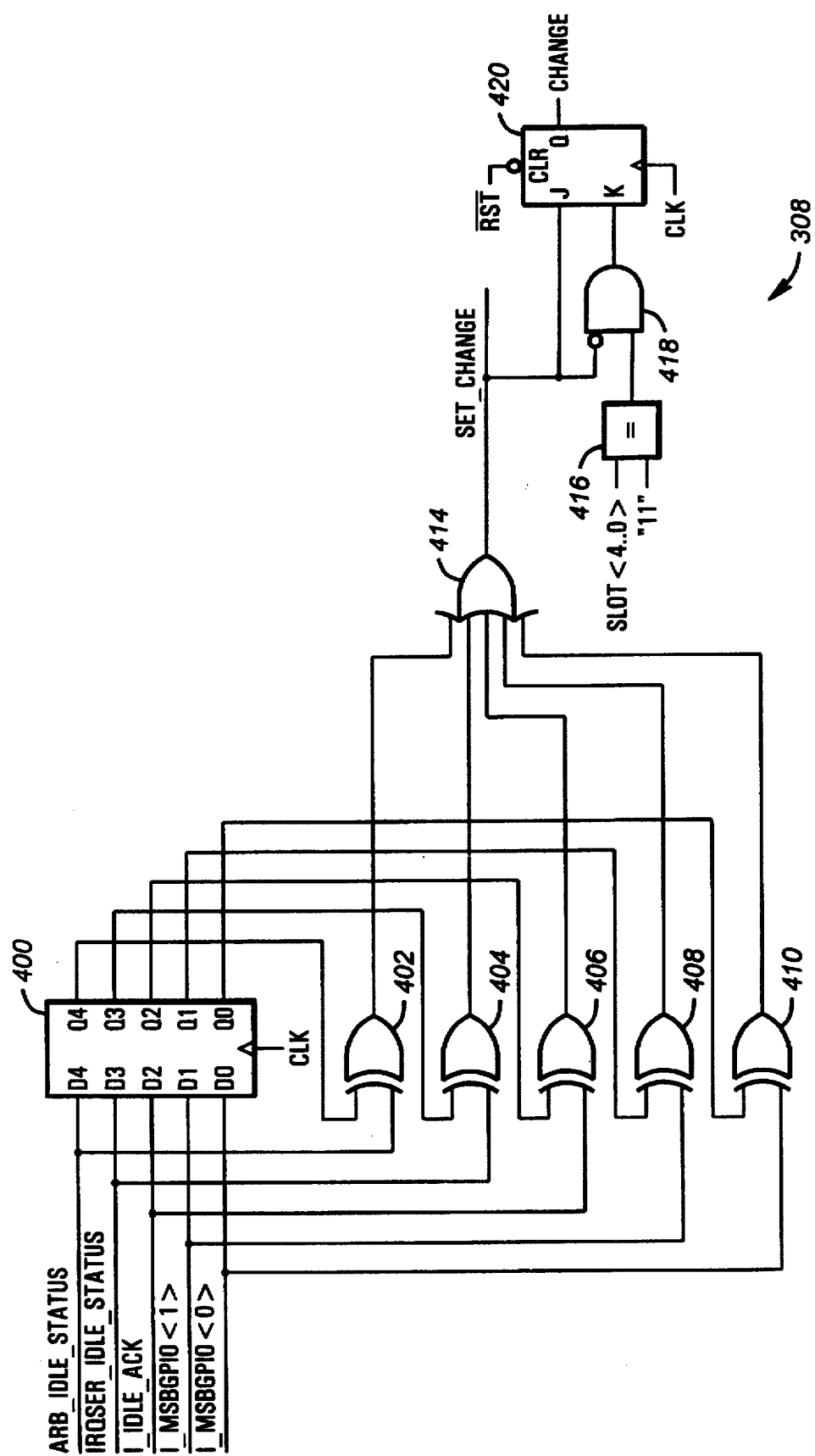
FIGS. 5 and 6 are more detailed block diagram illustrating the serial interface of FIG. 3.

In order to detect a change in the TRANSMIT_REG register 303, the change detection circuit 308 monitors the contents of the TRANSMIT_REG register 303 for two consecutive cycles of the CLK signal. A D-type flip-flop 400 (FIG. 5), clocked by the positive edge of the CLK signal, is used to produce a delay of one cycle of the CLK signal. The D-type flip-flop 400 performs multi-bit operations.

The D0 input of the flip-flop 400 receives the I_MSBGPIO<0> signal. The D1 input of flip-flop 400 receives the I_MSBGPIO<1> signal. The D2 input of the flip-flop 400 receives the I_IDLE_ACK signal. The D3 input of the flip-flop 400 receives the IRQSER_IDLE_STATUS signal. The D4 input of the flip-flop 400 receives the ARB_IDLE_STATUS signal. The output signals of the D-type flip-flop 400, provided at its outputs Q0–Q4, are delayed versions of the corresponding input signals. These outputs signals are delayed by one cycle of the CLK signal.

Exclusive OR gates (hereinafter referred to as "XOR" gates) 402, 404, 406, 408 and 410 compare the voltage levels present at the inputs and outputs of the flip-flop 400 in order to determine if a change in the data of the TRANSMIT_REG register 303 has occurred. The inputs of the XOR gate 402 are connected to the D4 input and the Q4 output of the flip-flop 400. The inputs of the XOR gate 404 are connected to the D3 input and the Q3 output of the flip-flop 400. The inputs of the XOR gate 406 are connected to the D2 input and the Q2 output of the flip-flop 400. The inputs of the XOR gate 408 are connected to the D1 input and the Q1 output of the flip-flop 400. The D0 input and the Q0 output of the flip-flop 400 are connected to the inputs of the XOR gate 410.

The outputs of the XOR gates 402, 404, 406, 408 and 410 are provided as inputs to an OR gate 414. The OR gate 414 provides the SET_CHANGE signal. The assertion of the SET_CHANGE signal indicates that during the previous cycle of the CLK signal, a change in the contents of the TRANSMIT_REG register 303 has occurred. Upon this occurrence, the CHANGE signal provided by a JK-type flip-flop 420 is asserted which indicates a change in the contents of the TRANSMIT_REG register 303.

The flip-flop 420 is clocked by the positive edge of the CLK signal. The J input of the flip-flop 420 receives the SET_CHANGE signal. The K input of the flip-flop 420 is connected to the output of an AND gate 418. The AND gate 418 receives the inverted SET_CHANGE signal at one of its inputs, and the other input of the AND gate 418 is connected to the output of an equal circuit 416.

The output of the equal circuit 416 is asserted if the inputs of the equal circuit 416 are equal, and the output of the equal circuit 416 is negated if the inputs to the equal circuit 416 are unequal. All of the equal circuits described below are of common design.

The inputs to the equal circuit 416 include the SLOT<4..0> signal and a 5 bit signal representative of "11." Thus, the CHANGE signal is negated when the SLOT<4..0> signal is equal to "11" if the SET_CHANGE signal does not indicate a recent change in the contents of the TRANSMIT_REG register 303. When the SLOT<4..0> signal is equal to "11," this indicates the beginning of the BRIDGE-TO-MSIO frame 700e. Thus, the contents of the TRANSMIT_REG register 303 are transferred in the current DATA_TRANSFER cycle, if possible. If the CHANGE signal is asserted after the beginning of the BRIDGE-TO-MSIO frame 700e, then a subsequent DATA_TRANSFER cycle is initiated after the current DATA_TRANSFER cycle.

In summary, the change detection circuit 308 monitors the data in the TRANSMIT_REG register 303 for two successive cycles of the CLK signal in order to detect a change in this data. The change detection circuit 308 provides a SET_CHANGE signal which indicates a transition in the data. The change detection circuit 308 also provides the CHANGE signal which initiates a subsequent DATA_TRANSFER cycle, after the current DATA_TRANSFER cycle, if necessary; however, this only occurs if the new data could not be transferred in the current DATA_TRANSFER cycle.

d. The Counter

The counter 300 (FIG. 6) includes a five bit counter circuit 500 whose output is a bus for carrying a SLOT<4:0> signal. The assertion of a PCI reset signal, $\overline{RST}$, initializes the SLOT<4..0> signal with a value of "20." The counter 500 is clocked by the positive edge of the CLK signal.

The input to the counter circuit 500 is driven by a multiplexer 510 with inputs A, B, C and D, all being five bit vectors. The A input receives the vector <0,0,0,0,0>, the B input receives the vector <0,0,0,0,1>, the C input receives a value which is an incremented value of the SLOT signal, while the D input is the SLOT signal. The C input is generated by an incrementer 512 whose input is connected to the SLOT signal. The multiplexer 510 is driven by a SELECT signal which selects the A input of the multiplexer 510 to be the output when EXT_START is asserted. The B input of the multiplexer 510 is selected when LOC_START is asserted and EXT_START is negated. The C input of the multiplexer 510 is selected when the value of SLOT is not equal to 0×14h and LOC_START and EXT_START are deasserted. The D input of the multiplexer 510 is selected when the value of SLOT is equal to 0×14h and LOC_START and EXT_START are deasserted.

The initialization value of the SLOT<4..0> signal depends on whether the START frame 700a is asserted by the serial interface 216 or the MSIO 134. If the serial interface 216 asserts the START frame 700a (FIG. 8), then the SLOT<4..0> signal equals "0" when the START frame 700a is asserted. If the MSIO 134 asserts the START frame 700a (FIG. 7), then the SLOT<4..0> signal equals "20" when the START frame 700a is asserted. Regardless of which device asserts the START frame 700a, during the next cycle of the CLK signal the SLOT<4..0> signal is equal to "1."

If the serial interface 216 asserts the START frame 700a, then the LOC_START signal is asserted by the serial interface 216 before the assertion of the START frame 700a. The assertion of the LOC_START signal indicates that the START frame 700a was generated locally by the serial interface 216 and not by the MSIO 134. If the previously described EXT_START signal is asserted by the external start detection circuit 312, this indicates that the START frame 700a is initiated by the MSIO 134.

Once either the LOC_START or the EXT_START signals are asserted, the SLOT<4..0> signal is initialized. When the EXT_START signal is asserted, which indicates the START frame 700a was asserted by the MSIO 134, the SLOT<4..0> signal is initialized to "0." However, when the LOC_START signal is asserted, which indicates that the START frame 700a is initiated by the MSBDATA serial interface 216, then the SLOT<4..0> signal is initialized to "1."

Figure 6:
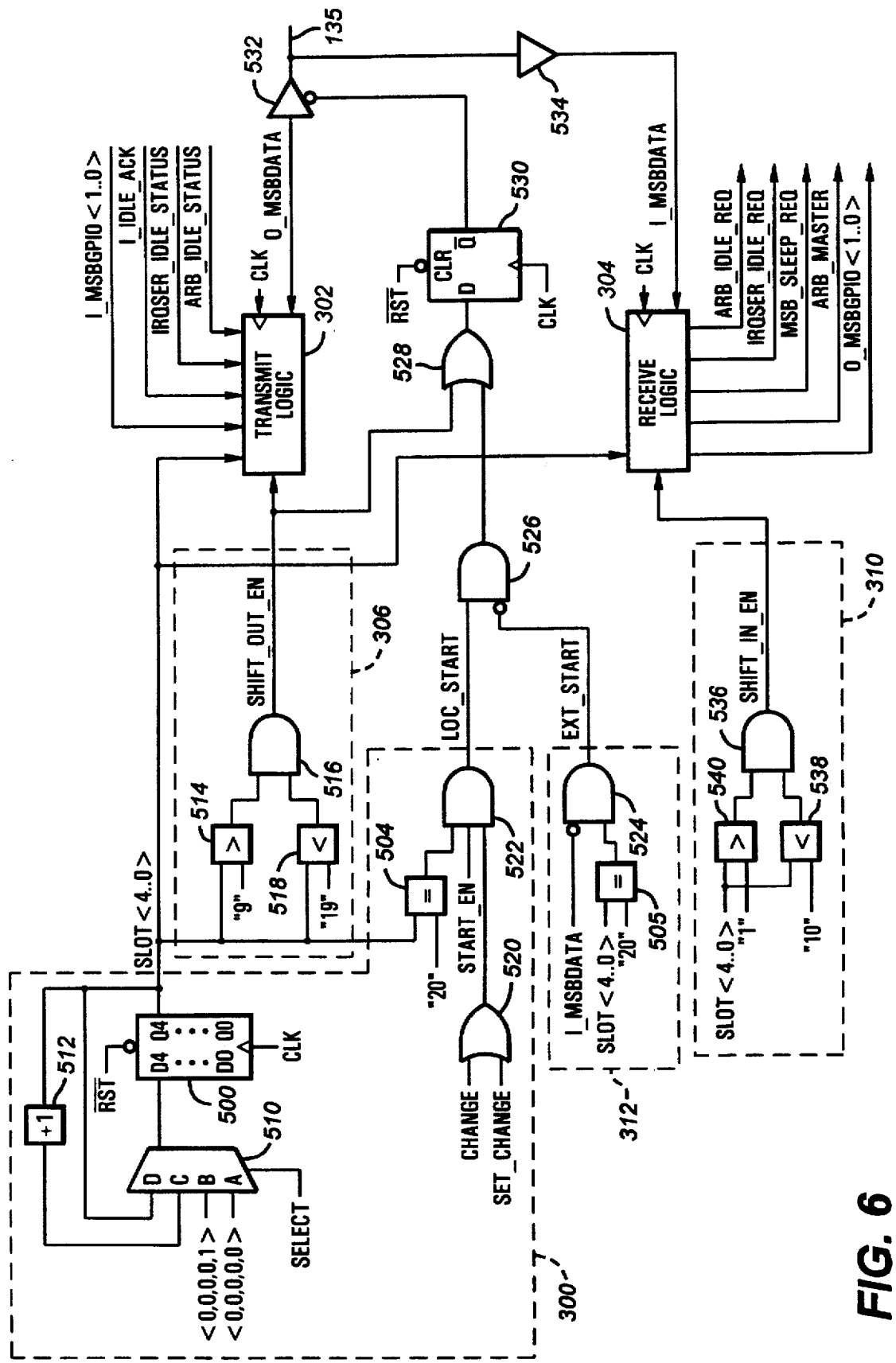

Referring to FIGS. 6 and 8, the LOC_START signal is asserted when either the CHANGE or the SET_CHANGE signal is asserted. The LOC_START signal is then negated on the next positive edge of the CLK signal.

Now referring to FIG. 7, the EXT_START signal is asserted when the SLOT<4..0> signal is equal to "20," and the serial bus 135 is negated. This indicates a START frame 700a on the serial bus 135 when the serial bus 135 is otherwise idle.

The counter 300 also includes circuitry to generate the LOC_START signal. The LOC_START signal is provided by the output of an AND gate 522. One input of the AND gate 522 receives the output of the equal circuit 504, as described above. Another input of the AND gate 522 receives a START_EN signal. The START_EN signal is reset to "0" after a PCI reset. Once activity is detected on the serial bus 135, indicated by a negation of the serial bus 135, then the START_EN signal is asserted by the serial interface 216. The START_EN signal remains asserted until another PCI reset. The third input of the AND gate 522 is connected to the output of an OR gate 520. The inputs to the OR gate 520 are the CHANGE and the SET_CHANGE signals. Thus, assuming that the START_EN signal is asserted, the LOC_START signal is asserted as long as the serial bus 135 is not in a DATA_TRANSFER cycle and either the CHANGE or the SET_CHANGE signal is asserted.

In summary, the counter 300 provides the SLOT<4..0> signal which is indicative of the current frame of the DATA_TRANSFER cycle. In the idle state of the serial bus 135, the SLOT<4..0> signal is equal to "20." The initialization value of the SLOT<4..0> signal depends on whether the START frame 700a was externally or internally asserted. The counter also includes circuitry to generate the LOC_START signal which indicates local assertion of the START frame 700a when asserted.

e. The Shift-Out Enable Logic

The shift-out enable logic generates a signal, SHIFT_OUT_EN, which enables or disables the transmit logic 302. When the SHIFT_OUT_EN signal is asserted, the transmit logic 302 serially transmits the bits of the TRANSMIT_REG register 303 to the serial bus 135 in a least significant bit first fashion. The serial output of the transmit logic 302 provides an output signal, O_MSBDATA, to the serial bus 135 during the conditions described below.

The SHIFT_OUT_EN signal is provided by the output of an AND gate 516. One input of the AND gate 516 is connected to the output of a greater-than-circuit 514. One input of the greater-than-circuit 514 is connected to the SLOT<4..0> signal, and the other input of the greater than circuit 514 is connected to a 5 bit signal representative of "9." When the SLOT<4..0> signal is greater than "9," then the output of the greater-than-circuit 514 is asserted. When the SLOT<4..0> signal is less than or equal to "9," then the output of the greater-than-circuit 514 is negated.

The other input of the AND gate 516 is connected to the output of a less-than-circuit 518. One input of the less-than-circuit 518 is connected to the SLOT<4..0> signal, the other input of the less-than-circuit 518 is connected to a 5 bit signal representative of "19." When the SLOT<4..0> signal is less than "19," then the output of the less-than-circuit 518 is asserted. When the SLOT<4..0> signal is greater than or equal to "19," then the output of the less-than-circuit 518 is negated.

In summary, if the SLOT<4..0> signal is greater than "9" and less than "19," the SHIFT_OUT_EN signal is asserted as the DATA_TRANSFER cycle is in the BRIDGE-TO-MSIO frame 700e. The transmit logic 302 is then enabled to serially provide the data of the TRANSMIT_REG register 303 to the serial bus 135 during this frame through the O_MSBDATA signal, as further described below.

For the equivalent circuitry in the MSIO 134 the compared values are greater than "1" and less than "0" to control shifting out in the MSIO 134 and only 8 bits are transferred, as the HIGH FRAME 700f is not required.

f. The Shift-In Enable Logic

The shift-in enable logic 310 provides a signal SHIFT_IN_EN. When the SHIFT_IN_EN signal is asserted, then the data received from the serial bus 135, represented by a signal, I_MSBDATA, is serially received by the receive logic 304 and provided to the RECEIVE_REG register 305 in a least significant bit first fashion. When the SHIFT_IN_EN signal is negated, then no data is received by the received logic 304 from the serial bus 135.

The SHIFT_IN_EN signal is provided by the output of an AND gate 536. One input of the AND gate 536 is connected to the output of a greater-than-circuit 540 and the other input of the AND gate 536 is connected to the output of a less-than-circuit 538. The operation of the greater-than-circuit 540 and the less-than-circuit 538 are similar to those described above.

One input of the greater-than-circuit 540 is connected to the SLOT<4..0> signal, and the other input of the greater-than-circuit 540 is connected to a 5 bit signal representative of "1." One input of the less-than-circuit 538 is connected to the SLOT<4..0> signal, and the other input of the less than circuit 538 is connected to a 5 bit signal representative of "10." Similarly, in the MSIO 134, the equivalent less than value is "19" and the equivalent greater than value is "9."

Thus, when the DATA_TRANSFER cycle is in the MSIO-TO-BRIDGE frame 700c, the SHIFT_IN_EN signal is asserted. This allows the data from the serial bus 135 to be serially received by the receive logic 304 through the I_MSBDATA signal. The receive logic 304 provides this data to the RECEIVE_REG register 305.

g. The External Start Detection Circuit

The EXT_START signal is provided by the output of an AND gate 524. One input of the AND gate 524 receives the inverted I_MSBDATA signal. The other input of the AND gate 524 is connected to the output of an equal circuit 505. The equal circuit 505 receives the SLOT<4..0> signal and a 5 bit signal representative of "20." Thus, if the serial bus 135 is idle and a negation is detected on the serial bus 135, the EXT_START signal is asserted.

h. The Interface Circuitry

The remaining circuitry shown in FIG. 6 furnishes an interface to the serial bus 135. The I_MSBDATA signal is provided by the output of a buffer 534. The input of the buffer 534 is connected to the serial bus 135.

A tristate buffer 532 receives the O_MSBDATA signal and provides this signal to the serial bus 135. The enable input of the tristate buffer 532 is connected to the inverting output of a D-type flip-flop 530 which is clocked by the positive edge of the CLK signal. The D input of the flip-flop 530 is connected to the output of an OR gate 528. One input of the OR gate 528 is connected to the output of an AND gate 526. The AND gate 526 receives the inverted EXT_START signal and the LOC_START signal.

Thus, if the LOC_START signal is asserted by the counter 300, the tristate buffer 532 is enabled for one cycle of the CLK signal beginning on the next positive edge of the CLK signal. As explained below, the input to the tristate buffer 532 is negated during this cycle of the CLK signal. Thus, the interface circuit 216 asserts the START frame 700a during this cycle of the CLK signal.

The other input of the OR gate 528 is connected to the SHIFT_OUT_EN signal. Thus, when the SHIFT_OUT_EN signal is first asserted, the tristate buffer 532 is enabled on the next positive edge of the CLK signal. This allows the O_MSBDATA signal to be provided to the serial bus 135 during the BRIDGE-TO-MSIO frame 700e.

The output of a D flip-flop 533 clocked by CLK provides the O_MSBDATA signal. Its D input is provided by an AND gate 531. One input of the AND gate 531 is connected to the serial output of the TRANSMIT_REG register 303, and the other input of the AND gate 531 receives the SHIFT_OUT_EN signal.

Thus, the tristate buffer 532 is enabled to drive the START frame 700a when the LOC_START signal is asserted. When this occurs, the O_MSBDATA signal is negated because of the negation of the SHIFT_OUT_EN signal. Furthermore, the tristate buffer 532 is enabled to serially provide the data of the TRANSMIT_REG register 303 to the serial bus 135 during the BRIDGE-TO-MSIO frame 700e. When this occurs, the SHIFT_OUT_EN signal is asserted; therefore, the voltage level of the O_MSBDATA signal directly depends on the serial output of the TRANSMIT_REG register 303.

In summary, the above-described interface circuitry provides the 0_MSBDATA signal to the serial bus 135 when the SHIFT_OUT_EN signal is asserted and when the START frame 700a needs to be asserted. The O_MSBDATA signal is negated when the START frame 700a is asserted. The interface circuitry also receives the I_MSBDATA signal from the serial bus 135. The I_MSBDATA signal provides the serial data for the RECEIVE_REG register 305 when the SHIFT_IN_EN signal is asserted.

i. The Transmit Logic

Figure 9:
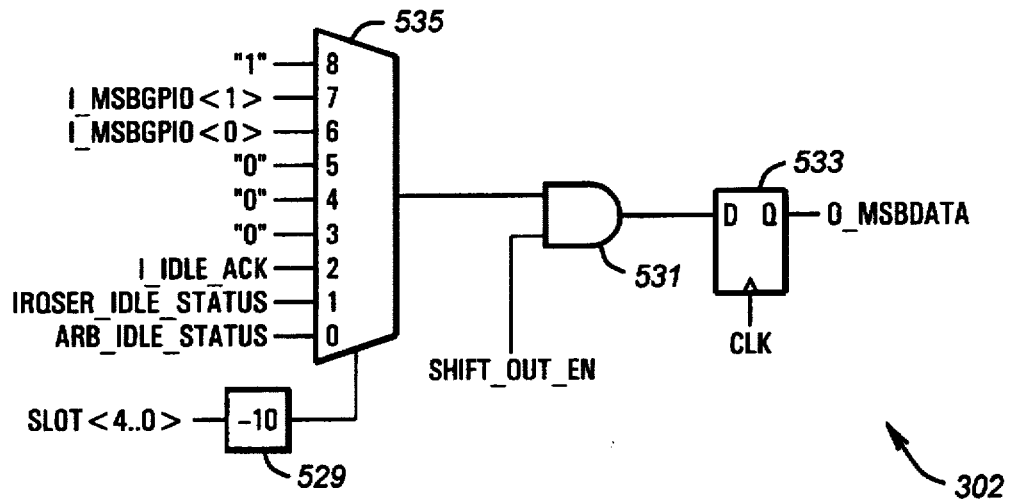
FIG. 9 is a block diagram illustrating the transmit logic of the present invention.

Shown in FIG. 9 is a block diagram illustrating operation of the transmit logic 302. A multiplexor 535 receives the ARB_IDLE_STATUS signal at its zero input; receives the IRQSER_IDLE_STATUS signal at its one input and receives the I_IDLE_ACK signal at its two input. The three, four and five inputs of the multiplexor 535 are negated. The six and seven inputs of the multiplexor 535 receive the I_MSBGPIO<0> signal and the I_MSBGPIO<1> signal, respectively. The eight input of the multiplexor 535 is asserted. The select input of the multiplexor 535 receives the output of a subtractor circuit 529 which subtracts 10 from its input. The input of the subtractor circuit 529 receives the SLOT<4..0> signal.

The output of the multiplexor 535 is connected to one input of an AND gate 531 which also receives the SHIFT_OUT_EN signal. The output of the AND gate 531 is provided to the input of a D-type flip-flop 533 which is clocked by the positive edge of the CLK signal. The flip-flop 533 provides the O_MSBDATA signal at its non-inverting output.

Thus, when the SHIFT_OUT_EN signal is asserted and the SLOT<4..0> signal is greater than "9," the bits of the TRANSMIT_REG register 303 are transmitted to the serial bus 135 through the O_MSBDATA signal in a least significant bit first fashion.

j. The Receive Logic

Figure 10:
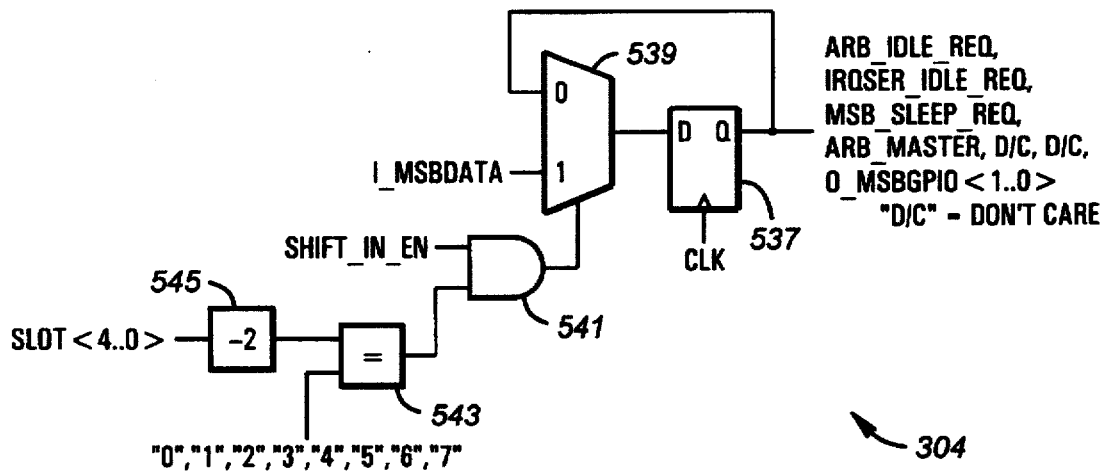
FIG. 10 is a block diagram illustrating the receive logic of the present invention.

Shown in FIG. 10 is a block diagram illustrating circuitry of the receive logic 304 for serially receiving one bit of the RECEIVE_REG register 305. Similar circuitry is used for each bit of the RECEIVE_REG register 305.

A multiplexor 539 has its one input connected to the I_MSBDATA signal and its zero input connected to the noninverting output of a flip-flop 537. The D-type flip-flop 537 is clocked by the positive edge of the CLK signal, and the input of the flip-flop 537 receives the output of the multiplexor 539. The noninverting output of the flip-flop 537 provides the received bit from the serial bus 135 to the RECEIVE_REG register 305.

The select input of the multiplexor 539 is provided by the output of an AND gate 541 which receives the SHIFT_IN_EN signal at one of its inputs. The other input of the AND gate 541 receives the output of an equal circuit 543. A first input of the equal circuit 543 is connected to the output of a subtractor circuit 545 which subtracts two from its input. The input of the subtractor circuit 545 receives the SLOT<4..0> signal.

A second input of the equal circuit 543 receives a five bit signal representative of the bit position of the received bit. For example, if the noninverting output of the flip-flop 537 provides the ARB_IDLE_REQ signal corresponding to bit position "0" in the RECEIVE_REG register 305, then the second input of the equal circuit 543 is a 5 bit signal representative of "0."

Thus, if the second input of the equal circuit 543 is equal to "0," when the SHIFT_IN_EN signal is asserted and the SLOT<4..0> signal is equal to "2," the noninverting output of the flip-flop 537 provides the ARB_IDLE_REQ signal. The other bits of the RECEIVE_REG register 305 are updated in a similar fashion.

5. Summary

To summarize the preferred embodiment, the TRANSMIT_REG register 303 is the register shadowed by the status register of the MSIO 134, and the RECEIVE_REG register 305 is the register shadowing the request register of the MSIO 134. The data transfers between these registers occur in the DATA_TRANSFER cycle of the serial bus 135. The shift-out enable logic 306 enables the transmit logic 302 to serially shift the contents of the TRANSMIT_REG register 303 to the serial bus 135 during the BRIDGE-TO-MSIO frame 700e. The shift-in enable logic 310 enables the receive logic 304 to serially receive the contents of the SHIFT_IN_REG register 304 from the serial bus 135 during the MSIO-TO-BRIDGE frame 700c.

The change detection circuit 308 detects a change in the data of the shadowed TRANSMIT_REG register 303 and initializes the counter 300 and its associated SLOT<4..0> signal appropriately when this occurs. When the data in the TRANSMIT_REG register 303 changes, the counter 300 asserts the LOC_START signal which initiates the assertion of the START frame 700a. If the data in the TRANSMIT_REG register 303 cannot be transferred in the current DATA_TRANSFER cycle, if any, then the serial interface 216 initiates another DATA_TRANSFER cycle.

The counter 300 provides the indication of the current frame of the DATA_TRANSFER cycle through the SLOT<4..0> signal. A DATA_TRANSFER cycle initiated by the MSIO 134 is detected by the external start detection circuit 312 which initializes the counter 300 and the SLOT<4..0> signal appropriately.

Thus, the present invention relates to a low latency serial bus system for shadowing one register of the bridge circuit 122 and the MSIO 134. Only one pin is required on each these devices. Furthermore, in the described embodiment, the shadowing of data between these registers has a maximum latency of only 21 PCI clock cycles.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. For use in a computer system having a first register with associated first data and a second register, a serial bus system for shadowing the first data of the first register in the second register, the serial bus system comprising:
   a serial bus;
   a change indicator coupled to the first register for providing a change signal for indicating a change in the first data;
   a serial transmitter coupled to said serial bus and to the first register for receiving the change signal and for serially transmitting serialized first data to said serial bus indicative of the first data when the change signal indicates a change in the first data; and
   a serial receiver coupled to said serial bus and to the second register for serially receiving the serialized first data from said serial bus and for providing the received serialized first data to the second register.

2. The serial bus system of claim 1, wherein the serialized first data is indicative of the first data in a least significant bit first format.

3. For use in a computer system having a first register with associated first data, a second register, a third register with associated third data and a fourth register, a serial bus system for shadowing the first data of the first register in the second register and the third data of the third register in the fourth register, the serial bus system comprising:
   a serial bus;
   a first change indicator coupled to the first register for providing a first change signal for indicating a change in the first data;
   a second change indicator coupled to the third register for providing a third change signal for indicating a change in the third data;
   a first serial transmitter coupled to said serial bus and to the first register for receiving the first change signal and for serially transmitting serialized first data to said serial bus indicative of the first data when the first change signal indicates a change in the first data;
   a second serial transmitter coupled to said serial bus and to the third register for receiving the third change signal and for serially transmitting serialized third data to said serial bus indicative of the third data when the third change signal indicates a change in the third data;
   a first serial receiver coupled to said serial bus and to the second register for serially receiving the serialized first data from said serial bus and for providing the received serialized first data to the second register; and
   a second serial receiver coupled to said serial bus and to the fourth register for serially receiving the serialized third data from said serial bus and for providing the received serialized third data to the fourth register.

4. The serial bus system of claim 3, wherein said first serial transmitter transmits the serialized first data after said second serial transmitter transmits the serialized third data.

5. The serial bus system of claim 4, further comprising:
   a start indicator coupled to said serial bus for receiving the first change signal and for providing a start signal to said serial bus when the first change signal indicates a change in the first data, and
   wherein said second serial transmitter transmits the serialized third data to said serial bus after the start signal is provided to said serial bus by said start indicator.

6. The serial bus system of claim 5, wherein said start indicator deasserts the start signal if said second transmitter is in the process of transmitting serialized third data when the first change signal indicates a change in the first data.

7. The serial bus system of claim 3, further comprising:
   a start indicator coupled to said serial bus for receiving the first change signal and for providing a start signal to said serial bus when the change signal indicates a change in the first data, and
   wherein said second serial transmitter transmits the serialized third data to said serial bus after the start signal is provided to said serial bus by said start indicator.

8. The serial bus system of claim 7, wherein said start indicator deasserts the start signal if said second serial transmitter is in the process of transmitting serialized third data when the first change signal indicates a change in the first data.

9. The serial bus system of claim 3, wherein the serialized first data is indicative of the first data in a least significant bit first format.

10. The serial bus system of claim 3, wherein the serialized third data is indicative of the third data in a least significant bit first format.

11. A computer system comprising:
    a first register with associated first data;
    a second register;
    a serial bus;
    a change indicator coupled to said first register for providing a change signal for indicating a change in the first data;
    a serial transmitter coupled to said serial bus and to said first register for receiving the change signal and for serially transmitting serialized first data to said serial bus indicative of the first data when the change signal indicates a change in the first data; and
    a serial receiver coupled to said serial bus and to said second register for serially receiving the serialized first data from said serial bus and for providing the received serialized first data to said second register.

12. The computer system of claim 11, wherein the serialized first data is indicative of the first data in a least significant bit first format.

13. A computer system having a portable computer and an expansion base unit, said computer system comprising:
    a first register with associated first data;
    a second register;
    a third register with associated third data;
    a fourth register;
    a serial bus adapted to connect said portable computer to said expansion base unit;
    a first change indicator coupled to said first register for providing a first change signal for indicating a change in the first data;
    a second change indicator coupled to said third register for providing a third change signal for indicating a change in the third data;
    a first serial transmitter coupled to said serial bus and to said first register for receiving the first change signal and for serially transmitting serialized first data to said serial bus indicative of the first data when the first change signal indicates a change in the first data;
    a second serial transmitter coupled to said serial bus and to said third register for receiving the third change signal and for serially transmitting serialized third data to said serial bus indicative of the third data when the third change signal indicates a change in the third data;

a first serial receiver coupled to said serial bus and to said second register for serially receiving the serialized first data from said serial bus and for providing the received serialized first data to said second register; and a second serial receiver coupled to said serial bus and to said fourth register for serially receiving the serialized third data from said serial bus and for providing the received serialized third data to said fourth register.

14. The computer system of claim 13, wherein said first serial transmitter transmits the serialized first data after said second serial transmitter transmits the serialized third data.

15. The computer system of claim 14, further comprising:

a start indicator coupled to said serial bus for receiving the first change signal and for providing a start signal to said serial bus when the first change signal indicates a change in the first data, and wherein said second serial transmitter transmits the serialized third data to said serial bus after the start signal is provided to said serial bus by said start indicator.

16. The computer system of claim 15, wherein said start indicator deasserts the start signal if said second serial transmitter is in the process of transmitting serialized third data when the first change signal indicates a change in the first data.

17. The computer system of claim 13, further comprising:

a start indicator coupled to said serial bus for receiving the first change signal and for providing a start signal to said serial bus when the change signal indicates a change in the first data, and wherein said second serial transmitter transmits the serialized third data to said serial bus after the start signal is provided to said serial bus by said start indicator.

18. The computer system of claim 17, wherein said start indicator deasserts the start signal if said second serial transmitter is in the process of transmitting serialized third data when the first change signal indicates a change in the first data.

19. The computer system of claim 13, wherein the serialized first data is indicative of the first data in a least significant bit first format.

20. The computer system of claim 13, wherein the serialized third data is indicative of the third data in a least significant bit first format.

21. For use in a computer system having a first register with associated first data, a second register and a serial bus, a method for shadowing first data of the first register in the second register, the method comprising the steps of:

determining if the first data has changed;

serially transmitting serialized first data to the serial bus indicative of the first data if the first data has changed; and serially receiving the serialized first data from the serial bus and providing the received serialized first data to the second register.

22. The method of claim 21, wherein the serialized first data is indicative of the first data in a least significant bit first format.

23. For use in a computer system having a first register with associated first data, a second register, a third register with associated third data, a fourth register and a serial bus, a method for shadowing first data of the first register in the second register and third data of the third register in the fourth register, the method comprising the steps of:

determining if the first data has changed;

determining if the third data has changed;

serially transmitting the serialized first data to the serial bus indicative of the first data when the first data has changed;

serially receiving the serialized first data from the serial bus and providing the received serialized first data to the second register;

serially transmitting the serialized third data to the serial bus indicative of the third data when the third data has changed; and serially receiving the serialized third data from the serial bus and providing the received serialized third data to the fourth register.

24. The method of claim 23, wherein said step of serially transmitting the serialized first data to the serial bus occurs before said step of transmitting the serialized third data to the serial bus.

25. The method of claim 24, wherein said step of serially transmitting the serialized third data to the serial bus occurs after the first data has changed.

26. The method of claim 25, wherein said step of serially transmitting the serialized third data to the serial bus does not occur if the first data changed prior to said step of serially transferring the serialized first data to the serial bus.

27. The method of claim 23, wherein said step of serially transmitting the serialized third data to the serial bus occurs when the first data has changed.

28. The method of claim 23, wherein said step of serially transmitting the serialized third data to the serial bus does not occur if the first data changed prior to said step of serially transferring the first data to the serial bus.

29. The method of claim 23, wherein the serialized first data is indicative of the first data in a least significant bit first format.

30. The method of claim 23, wherein the serialized third data is indicative of the third data in a least significant bit first format.

* * * * *